(12) United States Patent
Huang et al.

(10) Patent No.: US 12,439,922 B2
(45) Date of Patent: Oct. 14, 2025

(54) **PLANT-BASED CHEMICALS FOR *VARROA* MITE CONTROL**

(71) Applicant: Board of Trustees of Michigan State University, East Lansing, MI (US)

(72) Inventors: Zachary Huang, Okemos, MI (US); Xinjian Xu, Okemos, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 881 days.

(21) Appl. No.: 17/630,820

(22) PCT Filed: Jul. 29, 2020

(86) PCT No.: PCT/US2020/044082
§ 371 (c)(1),
(2) Date: Jan. 27, 2022

(87) PCT Pub. No.: WO2021/021939
PCT Pub. Date: Feb. 4, 2021

(65) Prior Publication Data
US 2022/0287307 A1 Sep. 15, 2022

Related U.S. Application Data

(60) Provisional application No. 62/880,153, filed on Jul. 30, 2019.

(51) Int. Cl.
*A01N 43/90* (2006.01)
*A01N 25/02* (2006.01)
*A01P 7/02* (2006.01)

(52) U.S. Cl.
CPC ............ *A01N 43/90* (2013.01); *A01N 25/02* (2013.01); *A01P 7/02* (2021.08)

(58) Field of Classification Search
CPC ............ A01N 43/90; A01N 25/02; A01P 7/02
See application file for complete search history.

(56) References Cited

U.S. PATENT DOCUMENTS

| | | | |
|---|---|---|---|
| 6,008,046 A | * | 12/1999 | Ffrench-Constant ................. C07K 14/43581 435/348 |
| 2004/0177398 A1 | * | 9/2004 | Palaivelu ................. A01H 3/04 800/276 |
| 2012/0309703 A1 | | 12/2012 | Behrens et al. |
| 2014/0296210 A1 | | 10/2014 | Garner et al. |
| 2015/0025061 A1 | * | 1/2015 | Karakossian .......... A61K 31/41 514/211.09 |

FOREIGN PATENT DOCUMENTS

| | | |
|---|---|---|
| CN | 103385867 | 4/2015 |
| IN | 202217010039 | 4/2022 |
| WO | WO-2021021939 A1 | 2/2021 |

OTHER PUBLICATIONS

Stopfer et al., "Impaired odour discrimination on desynchronization of odour-encoding neural assemblies," Nature vol. 390 Nov. 6, 1997. (Year: 1997).*
"European Application Serial No. 20848357.8, Response filed Jan. 4, 2024 to Extended European Search Report mailed Jun. 16, 2023", 13 pages.
"International Application Serial No. PCT US2020 044082, International Preliminary Report on Patentability mailed Feb. 10, 2022", 5 pgs.
"European Application Serial No. 20848357.8, Response to Communication pursuant to Rules 161(2) and 162 EPC Filed Sep. 19, 2022", 10 pgs.
"European Application Serial No. 20848357.8, Extended European Search Report mailed Jun. 16, 2023", 14 pgs.
"Compound Summary for CID 442292", Database Pubchem Compound, (Jun. 24, 2005), 41 pages.
Michael, Gassel, "The novel isoxazoline ectoparasiticide fluralaner: Selective inhibition of arthropod and#947;-aminobutyric acid- and I-glutamate-gated chloride channels and insecticidal acaricidal activity", Insects Biochemistry and Molecular Biology, vol. 45, (Feb. 1, 2014), 14 pgs.
Price, Kerry L, "An atypical residue in the pore of Varroa destructor GABAactivated RDL receptors affects picrotoxin block and thymol modulation", Insects Biochemistry and Molecular Biology, vol. 55, (Dec. 1, 2014), 7 pgs.
Ticku, M K, "Picrotoxinin binding sites at the GABA synapse: A target for drug action", Brain Research Bulletin, Elsevier Science Ltd, Oxford, GB, vol. 5, (Jan. 1, 1980), 4 pgs.
Watanabe, Le, "Nematocidal Activity of Picrodendrins against a Species of Diplogastridae", vol. 22, No. 12, (Jan. 1, 1999), 4 pgs.
"International Application Serial No. PCT/US2020/044082, International Search Report mailed Oct. 26, 2020", 2 pgs.
"International Application Serial No. PCT/US2020/044082, Written Opinion mailed Oct. 26, 2020", 3 pgs.
"PubChem CID: 442292", (Jun. 24, 2005), 33 pgs.
"Indian Application Serial No. 202217010039, First Examination Report mailed Oct. 29, 2024", with English translation, 7 pages.
"European Application Serial No. 20848357.8, Communication Pursuant to Article 94(3) EPC mailed May 28, 2025", 7 pages.

* cited by examiner

*Primary Examiner* — Jared Barsky
(74) *Attorney, Agent, or Firm* — Schwegman Lundberg & Woessner, P.A.

(57) ABSTRACT

Described herein are compositions and methods for killing or inhibiting honey bee parasites such as *Varroa* mites.

7 Claims, 1 Drawing Sheet

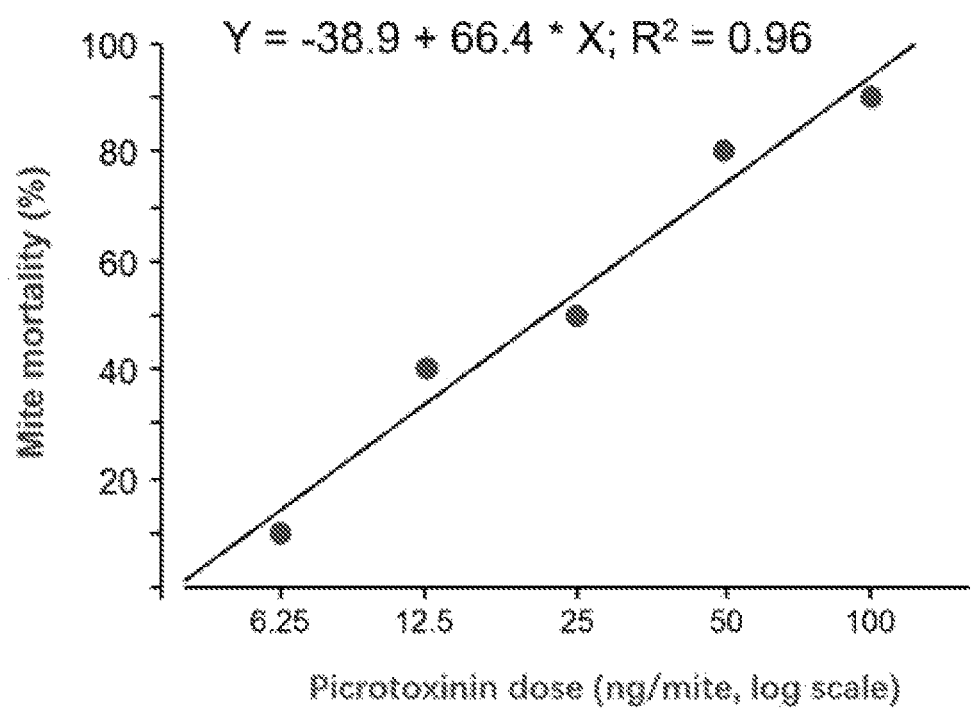

PLANT-BASED CHEMICALS FOR *VARROA* MITE CONTROL

CLAIM FOR PRIORITY

This application is U.S. National Stage Filing under 35 U.S.C. 371 of International Patent Application Serial No. PCT/US2020/044082, filed Jul. 29, 2020, and published as WO 2021/021939 A1 on Feb. 4, 2021, which claims benefit of priority to the filing date of U.S. Provisional Application Ser. No. 62/880,153, filed Jul. 30, 2019, the contents of which are specifically incorporated herein by reference in their entirety.

BACKGROUND

Insect pollination accounts for 35% of global crop production (Lonsdorf et al. 2011; Winfree et al. 2011), and honeybees, *Apis mellifera* L., probably accounts for the majority of insect pollination (Morse and Calderone 2000; Klein et al. 2007). Although non-honey bees, including many native bee species, make substantial contributions as pollinators ((Ollerton et al. 2012), the monetary value that U. S. honey bees provide as pollinators ranges from $12.3 to $16.4 billion annually (Losey and Vaughan 2006). A single major crop, such as California almonds, depends heavily upon honey bee pollination and was worth $5.77 billion in 2014 (USDA NASS 2015). Honey bee pollination is also important to non-food crops and can contribute to key goals such as increasing the yield of strategic biofuels (Vaknin 2011).

*Varroa destructor* is currently by far the most serious honey bee pest in the world. The major contributing factor to over-wintering mortalities, especially in the cold area, are due to this parasite (Chauzat et al. 2010; Dainet et al. 2010; Guzman-Novoa et al. 2010). *Varroa* weakens the immune systems of honeybees (Nazzi et al. 2012 but see Kuster et al. 2014) and can transmit many bee viruses (Chen et al. 2004; Shen et al. 2005; Di Prisco et al. 2011). For example, deformed wing virus was recently shown to affect winter mortality (Highfield et al. 2009; Nazzi et al. 2012).

Many chemicals used for *varroa* control (such as pyrethroid, organophosphates) are toxic to honey bees, and mites also quickly adapt to them by becoming resistant. This makes it necessary to explore new methods for *Varroa* control so that we can rotate different chemicals and slow the development of resistance.

SUMMARY

Described herein are compounds, compositions and methods for inhibiting the growth and spreading of honeybee parasites.

DESCRIPTION OF THE FIGURE

FIG. 1 graphically illustrates responses of colonies of mites to different doses of picrotoxinin. The LD50 for this particular trial was determined to be 22.61 ng/mite. The experiment was replicated three times using mites from three different colonies.

DETAILED DESCRIPTION

Compounds, compositions and methods are described herein for inhibiting the growth and spreading of honeybee parasites. The compounds can be sesquiterpenoid compounds. The compounds can in some cases be gamma-aminobutyric (GABA) antagonists and/or serotonergic antagonists.

For example, the compound can have Formula I:

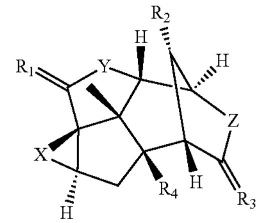

I wherein:

X, Y, and Z are independently oxygen, amino, or sulfur;

$R_1$ and $R_3$ are each independently an oxygen atom, amino, sulfur, sulfide, or sulfoxide;

$R_2$ is lower alkyl or lower alkylene; and $R_4$ is hydroxy, sulfide, sulfoxide or sulfate.

The term "alkyl" as used herein refers to substituted or unsubstituted straight chain, branched and cyclic, saturated mono- or bi-valent groups having from 1 to 20 carbon atoms, 10 to 20 carbon atoms, 12 to 18 carbon atoms, 6 to about 10 carbon atoms, 1 to 10 carbons atoms, 1 to 8 carbon atoms, 2 to 8 carbon atoms, 3 to 8 carbon atoms, 4 to 8 carbon atoms, 5 to 8 carbon atoms, 1 to 6 carbon atoms, 2 to 6 carbon atoms, 3 to 6 carbon atoms, or 1 to 3 carbon atoms. Examples of straight chain mono-valent ($C_1$-$C_{20}$)-alkyl groups include those with from 1 to 8 carbon atoms such as methyl (i.e., $CH_3$), ethyl, n-propyl, n-butyl, n-pentyl, n-hexyl, n-heptyl, n-octyl groups. Examples of branched mono-valent ($C_1$-$C_{20}$)-alkyl groups include isopropyl, iso-butyl, sec-butyl, t-butyl, neopentyl, and isopentyl. Examples of straight chain bi-valent ($C_1$-$C_{20}$)alkyl groups include those with from 1 to 6 carbon atoms such as —$CH_2$—, —$CH_2CH_2$—, —$CH_2CH_2CH_2$—, —$CH_2CH_2CH_2CH_2$—, and —$CH_2CH_2CH_2CH_2CH_2$—. Examples of branched bi-valent alkyl groups include —$CH(CH_3)$ $CH_2$— and —$CH_2CH(CH_3)CH_2$—. Examples of cyclic alkyl groups include cyclopropyl, cyclobutyl, cyclopentyl, cyclohexyl, cyclooctyl, bicyclo[1.1.1]pentyl, bicyclo[2.1.1]hexyl, and bicyclo[2.2.1]heptyl. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. In some embodiments, alkyl includes a combination of substituted and unsubstituted alkyl. As an example, alkyl and ($C_1$)alkyl, includes methyl and substituted methyl. As a particular example, ($C_1$)alkyl includes benzyl. As a further example, alkyl can include methyl and substituted ($C_2$-$C_8$)alkyl. Alkyl can also include substituted methyl and unsubstituted ($C_2$-$C_8$)alkyl. In some embodiments, alkyl can be methyl and $C_2$-$C_8$ linear alkyl. In some embodiments, alkyl can be methyl and $C_2$-$C_8$ branched alkyl. The term methyl is understood to be —$CH_3$, which is not substituted. The term methylene is understood to be —$CH_2$—, which is not substituted. For comparison, the term ($C_1$)alkyl is understood to be a substituted or an unsubstituted —$CH_3$ or a substituted or an unsubstituted —$CH_2$—. Representative substituted alkyl groups can be substituted one or more times with any of the groups listed herein, for example, cycloalkyl, heterocyclyl, aryl, amino, haloalkyl, hydroxy, cyano, carboxy, nitro, thio, alkoxy, and halogen groups. As further example, representative substituted alkyl groups can be substituted one or more fluoro, chloro, bromo, iodo, amino, amido, alkyl, alkoxy, alkylamido, alkenyl, alkynyl, alkoxycarhonyl, acyl, formyl, arylcarbonyl, aryloxycarbonyl, aryloxy, carboxy, haloalkyl, hydroxy, cyano, nitroso, nitro, azido, trifluoromethyl, trifluoromethoxy, thio, alkylthio, arylthiol, alkylsulfonly, alkylsulfinyl, dialkylaminosulfonyl, sulfonic acid, carboxylic acid, dialkylamino and dialkylamido. In some embodiments, representative substituted alkyl groups can be substituted with one or more groups such as amino, hydroxy, cyano, carboxy, nitro, thio, alkoxy, or halogen groups. Thus, in some embodiments, alkyl can be substituted with a non-halogen group. For example, representative substituted alkyl groups can be substituted with a fluoro group, substituted with a bromo group, substituted with a halogen other than bromo, or substituted with a halogen other than fluoro. In some embodiments, representative substituted alkyl groups can be substituted with one, two, three or more fluoro groups or they can be substituted with one, two, three or more non-fluoro groups. For example, alkyl can be trifluoromethyl, difluoromethyl, or fluoromethyl, or alkyl can be substituted alkyl other than trifluoromethyl, difluoromethyl or fluoromethyl. Alkyl can be haloalkyl or alkyl can be substituted alkyl other than haloalkyl. The term "alkyl" also generally refers to alkyl groups that can comprise one or more heteroatoms in the carbon chain. Thus, for example, "alkyl" also encompasses groups such as —[(CH$_2$)$_p$O]$_q$H and the like.

The term "alkenyl" as used herein refers to substituted or unsubstituted straight chain, branched and cyclic, saturated mono- or bi-valent groups having at least one carbon-carbon double bond and from 2 to 20 carbon atoms, 10 to 20 carbon atoms, 12 to 18 carbon atoms, 6 to about 10 carbon atoms, 2 to 10 carbons atoms, 2 to 8 carbon atoms, 3 to 8 carbon atoms, 4 to 8 carbon atoms, 5 to 8 carbon atoms, 2 to 6 carbon atoms, 3 to 6 carbon atoms, 4 to 6 carbon atoms, 2 to 4 carbon atoms, or 2 to 3 carbon atoms. The double bonds can be trans or cis orientation. The double bonds can be terminal or internal. The alkenyl group can be attached via the portion of the alkenyl group containing the double bond, e.g., vinyl, propen-1-yl and buten-1-yl, or the alkenyl group can be attached via a portion of the alkenyl group that does not contain the double bond, e.g., penten-4-yl. Examples of mono-valent (C$_2$-C$_{20}$)-alkenyl groups include those with from 1 to 8 carbon atoms such as vinyl, propenyl, propen-1-yl, propen-2-yl, butenyl, buten-1-yl, buten-2-yl, sec-buten-1-yl, sec-buten-3-yl, pentenyl, hexenyl, heptenyl and octenyl groups. Examples of branched mono-valent (C$_2$-C$_{20}$)-alkenyl groups include isopropenyl, iso-butenyl, sec-butenyl, t-butenyl, neopentenyl, and isopentenyl. Examples of straight chain bi-valent (C$_2$-C$_{20}$)alkenyl groups include those with from 2 to 6 carbon atoms such as —CHCH—, —CHCHCH$_2$—, —CHCHCH$_2$CH$_2$—, and —CHCHCH$_2$CH$_2$CH$_2$—. Examples of branched bi-valent alkyl groups include —C(CH$_3$)CH— and —CHC(CH$_3$)CH$_2$—. Examples of cyclic alkenyl groups include cyclopentenyl, cyclohexenyl and cyclooctenyl. It is envisaged that alkenyl can also include masked alkenyl groups, precursors of alkenyl groups or other related groups. As such, where alkenyl groups are described, compounds are also envisaged where a carbon-carbon double bond of an alkenyl is replaced by an epoxide or anticline ring. Substituted alkenyl also includes alkenyl groups which are substantially tautomeric with a non-alkenyl group. For example, substituted alkenyl can be 2-aminoalkenyl, 2-aikylaminoalkenyl, 2-hydroxyalkenyl, 2-hydroxyvinyl, 2-hydroxypropenyl, but substituted alkenyl is also understood to include the group of substituted alkenyl groups other than alkenyl which are tautomeric with non-alkenyl containing groups. In some embodiments, alkenyl can be understood to include a combination of substituted and unsubstituted alkenyl. For example, alkenyl can be vinyl and substituted vinyl. For example, alkenyl can be vinyl and substituted (C$_3$-C$_8$)alkenyl. Alkenyl can also include substituted vinyl and unsubstituted (C$_3$-C$_8$)alkenyl. Representative substituted alkenyl groups can be substituted one or more times with any of the groups listed herein, for example, monoalkylamino, dialkylamino, cyano, acetyl, amido, carboxy, nitro, alkylthio, alkoxy, and halogen groups. As further example, representative substituted alkenyl groups can be substituted one or more fluoro, chloro, bromo, iodo, amino, amido, alkyl, alkoxy, alkylamido, alkenyl, alkynyl, alkoxycarbonyl, acyl, formyl, arylcarbonyl, aryloxycarbonyl, aryloxy, carboxy, haloalkyl, hydroxy, cyano, nitroso, nitro, azido, trifluoromethyl, trifluoromethoxy, thio, alkylthio, arylthiol, alkylsulfonyl, alkylsulfinyl, dialkylaminosulfonyl, sulfonic acid, carboxylic acid, dialkylamino and dialkylamido. In some embodiments, representative substituted alkenyl groups can be substituted from one or more groups such as monoalkylamino, dialkylamino, cyano, acetyl, amido, carboxy, nitro, alkylthio, alkoxy, or halogen groups. Thus, in some embodiments, alkenyl can be substituted with a non-halogen group. In some embodiments, representative substituted alkenyl groups can be substituted with a fluoro group, substituted with a bromo group, substituted with a halogen other than bromo, or substituted with a halogen other than fluoro. For example, alkenyl can be 1-fluorovinyl, 2-fluorovinyl, 1,2-difluorovinyl, 1,2,2-trifluorovinyl, 2,2-difluorovinyl, trifluoropropen-2-yl, 3,3,3-trifluoropropenyl, 1-fluoropropenyl, 1-chlorovinyl, 2-chlorovinyl, 1,2-dichlorovinyl, 1,2,2-trichlorovinyl or 2,2-dichlorovinyl. In some embodiments, representative substituted alkenyl groups can be substituted with one, two, three or more fluoro groups or they can be substituted with one, two, three or more non-fluoro groups.

The term "alkynl" as used herein, refers to substituted or unsubstituted straight and branched chain alkyl groups, except that at least one triple bond exists between two carbon atoms. Thus, alkynyl groups have from 2 to 50 carbon atoms, 2 to 20 carbon atoms, 10 to 20 carbon atoms, 12 to 18 carbon atoms, 6 to about 10 carbon atoms, 2 to 10 carbons atoms, 2 to 8 carbon atoms, 3 to 8 carbon atoms, 4 to 8 carbon atoms, 5 to 8 carbon atoms, 2 to 6 carbon atoms, 3 to 6 carbon atoms, 4 to 6 carbon atoms, 2 to 4 carbon atoms, or 2 to 3 carbon atoms. Examples include, but are not limited to ethynyl, propynyl, propyn-1-yl, propyn-2-yl, butynyl, butyn-1-yl, butyn-2-yl, butyn-3-yl, butyn-4-yl, pentynyl, pentyn-1-yl, hexynyl, Examples include, but are not limited to —CH≡CH, —C≡C(CH$_3$), —C≡C(CH$_2$CH$_3$), —CH$_2$C≡CH, —CH$_2$C≡C(CH$_3$), and —CH$_2$C≡C(CH$_2$CH$_3$) among others.

The term "aryl" as used herein refers to substituted or unsubstituted univalent groups that are derived by removing a hydrogen atom from an arene, which is a cyclic aromatic hydrocarbon, having from 6 to 20 carbon atoms, 10 to 20 carbon atoms, 12 to 20 carbon atoms, 6 to about 10 carbon atoms or 6 to 8 carbon atoms. Examples of (C$_6$-C$_{20}$)aryl groups include phenyl, napthalenyl, azulenyl, biphenylyl, indacenyl, fluorenyl, phenanthrenyl, triphenylenyl, pyrenyl, naphthacenyl, chrysenyl, anthracenyl groups. Examples include substituted phenyl, substituted napthalenyl, substituted azulenyl, substituted biphenylyl, substituted indacenyl, substituted fluorenyl, substituted phenanthrenyl, substituted triphenylenyl, substituted pyrenyl, substituted naphthacenyl, substituted chrysenyl, and substituted anthracenyl groups. Examples also include unsubstituted phenyl, unsubstituted napthalenyl, unsubstituted azulenyl, unsubstituted biphenylyl, unsubstituted indacenyl, unsubstituted fluorenyl, unsubstituted phenanthrenyl, unsubstituted triphenylenyl, unsubstituted pyrenyl, unsubstituted naphthacenyl, unsubstituted chrysenyl, and unsubstituted anthracenyl groups. Aryl includes phenyl groups and non-phenyl aryl groups. From these examples, it is clear that the term $(C_6-C_{20})$aryl encompasses mono- and polycyclic $(C_6-C_{20})$aryl groups, including fused and non-fused polycyclic $(C_6-C_{20})$aryl groups.

The term "alkoxy" as used herein refers to an oxygen atom connected to an alkyl group, including a cycloalkyl group, as are defined herein. Examples of linear alkoxy groups include but are not limited to methoxy, ethoxy, propoxy, butoxy, pentyloxy, hexyloxy, and the like. Examples of branched alkoxy include but are not limited to isopropoxy, sec-butoxy, tert-butoxy, isopentyloxy, isohexyloxy, and the like. Examples of cyclic alkoxy include but are not limited to cyclopropyloxy, cyclobutyloxy, cyclopentyloxy, cyclohexyloxy, and the like. An alkoxy group can include one to about 12-20 or about 12-40 carbon atoms bonded to the oxygen atom, and can further include double or triple bonds, and can also include heteroatoms. Thus, alkyloxy also includes an oxygen atom connected to an alkyenyl group and oxygen atom connected to an alkynyl group. For example, an allyloxy group is an alkoxy group within the meaning herein. A methoxyethoxy group is also an alkoxy group within the meaning herein, as is a methylenedioxy group in a context where two adjacent atoms of a structure are substituted therewith.

The terms "halo," "halogen," or "halide" group, as used herein, by themselves or as part of another substituent, mean, unless otherwise stated, a fluorine, chlorine, bromine, or iodine atom.

The term "amine" and "amino" as used herein refers to a substituent of the form $-NH_2$, $-NHR$, $-NR_2$, $-NR_3^+$, wherein each R is independently selected, and protonated forms of each, except for $-NM_3^+$, which cannot be protonated. Accordingly, any compound substituted with an amino group can be viewed as an amine. An "amino group" within the meaning herein can be a primacy, secondary, tertiary, or quaternary amino group. An "alkylamino" group includes a monoalkylamino, dialkylamino, and trialkylamino group.

The term "acyl" as used herein refers to a group containing a carbonyl moiety wherein the group is bonded via the carbonyl carbon atom. The carbonyl carbon atom is also bonded to another carbon atom, which can be part of a substituted or unsubstituted alkyl, alkenyl, alkynyl, aryl, cycloalkyl, heterocyclyl, group or the like.

The term "formyl" as used herein refers to a group containing a carbonyl moiety wherein the group is bonded via the carbonyl carbon atom. The carbonyl carbon atom is also bonded to a hydrogen atom.

The term "alkoxycarbonyl" as used herein refers to a group containing a carbonyl moiety wherein the group is bonded via the carbonyl carbon atom. The carbonyl carbon atom is also bonded to an oxygen atom which is further bonded to an alkyl group. Alkoxycarbonyl also includes the group where a carbonyl carbon atom is also bonded to an oxygen atom which is further bonded to an alkyenyl group. Alkoxycarbonyl also includes the group where a carbonyl carbon atom is also bonded to an oxygen atom which is further bonded to an alkynyl group. In a further case, which is included in the definition of alkoxycarbonyl as the term is defined herein, and is also included in the term "aryloxycarbonyl," the carbonyl carbon atom is bonded to an oxygen atom which is bonded to an aryl group instead of an alkyl group.

The term "arylcarbonyl" as used herein refers to a group containing a carbonyl moiety wherein the group is bonded via the carbonyl carbon atom. The carbonyl carbon atom is also bonded to an aryl group.

The term "alkylamido" as used herein refers to a group containing a carbonyl moiety wherein the group is bonded via the carbonyl carbon atom. The carbonyl carbon atom is also bonded to a nitrogen group which is bonded to one or more alkyl groups. In a further case, which is also an alkylamido as the term is defined herein, the carbonyl carbon atom is bonded to a nitrogen atom which is bonded to one or more aryl group instead of, or in addition to, the one or more alkyl group. In a further case, which is also an alkylamido as the term is defined herein, the carbonyl carbon atom is bonded to a nitrogen atom which is bonded to one or more alkenyl group instead of, or in addition to, the one or more alkyl and or/aryl group. In a further case, which is also an alkylamido as the term is defined herein, the carbonyl carbon atom is bonded to a nitrogen atom which is bonded to one or more alkynyl group instead of, or in addition to, the one or more alkyl, alkenyl and/or aryl group.

The term "carboxy" as used herein refers to a group containing a carbonyl moiety wherein the group is bonded via the carbonyl carbon atom. The carbonyl carbon atom is also bonded to a hydroxy group or oxygen anion so as to result in a carboxylic acid or carboxylate. Carboxy also includes both the protonated form of the carboxylic acid and the salt form. For example, carboxy can be understood as COOH or $CO_2H$.

The term "substituted" as used herein refers to a group that is substituted with one or more groups including, but not limited to, the following groups: halogen (e.g., F, Cl, Br, and I), R, OR, $OC(O)N(R)_2$, CN, NO, $NO_2$, $ONO_2$, azido, $CF_3$, $OCF_3$, methylenedioxy, ethylenedioxy, $(C_3-C_{20})$heteroaryl, $N(R)_2$, $Si(R)_3$, SR, SOR, $SO_2R$, $SO_2N(R)_2$, $SO_3R$, $P(O)(OR)_2$, $OP(O)(OR)_2$, C(O)R, C(O)C(O)R, $C(O)CH_2C(O)R$, C(S)R, C(O)OR, OC(O)R, $C(O)N(R)_2$, C(O)N(R)OH, $OC(O)N(R)_2$, $C(S)N(R)_2$, $(CH_2)_{0-2}N(R)C(O)R$, $(CH_2)_{0-2}N(R)N(R)_2$, N(R)N(R)C(O)R, N(R)N(R)C(O)OR, N(R)N(R)CON(R)_2$, $N(R)SO_2R$, $N(R)SO_2N(R)_2$, N(R)C(O)OR, N(R)C(O)R, N(R)C(S)R, $N(R)C(O)N(R)_2$, $N(R)C(S)N(R)_2$, N(COR)COR, N(OR)R, C(=NH)N(R)_2, C(O)N(OR)R, or C(=NOR)R wherein R can be hydrogen, $(C_1-C_{20})$alkyl or $(C_6-C_{20})$aryl. Substituted also includes a group that is substituted with one or more groups including, but not limited to, the following groups: fluoro, chloro, bromo, iodo, amino, amido, alkyl, alkoxy, alkylamido, alkenyl, alkynyl, alkoxycarbonyl, acyl, formyl, arylcarbonyl, aryloxycarbonyl, aryloxy, carboxy, haloalkyl, hydroxy, cyano, nitroso, nitro, azido, trifluoromethyl, trifluoromethoxy, thio, alkylthio, arylthio, alkylsulfonyl, alkylsulfinyl, dialkylaminosulfonyl, sulfonic acid, carboxylic acid, dialkylamino and dialkylamido. Where there are two or more adjacent substituents, the substituents can be linked to form a carbocyclic or heterocyclic ring. Such adjacent groups can have a vicinal or germinal relationship, or they can be adjacent on a ring in, e.g., an ortho-arrangement. Each instance of substituted is understood to be independent. For example, a substituted aryl can be substituted with bromo and a substituted heterocycle on the same compound can be substituted with alkyl. It is envisaged that a substituted group can be substituted with one or more non-fluoro groups. As another example, a substituted group can be substituted with one or more non-cyano groups. As another example, a substituted group can be substituted with one or more groups other than haloalkyl. In yet another example, a substituted group can be substituted with one or more groups other than tert-butyl. As yet a further example, a substituted group can be substituted with one or more groups other than trifluoromethyl. As yet even further examples, a substituted group can be substituted with one or more groups other than nitro, other than methyl, other than methoxymethyl, other than dialkylaminosulfonyl, other than bromo, other than chloro, other than amido, other than halo, other than benzodioxepinyl, other than polycyclic heterocyclyl, other than polycyclic substituted aryl, other than methoxycarbonyl, other than alkoxycarbonyl, other than thiophenyl, or other than nitrophenyl, or groups meeting a combination of such descriptions. Further, substituted is also understood to include fluoro, cyano, haloalkyl, tert-butyl, trifluoromethyl, nitro, methyl, methoxymethyl, dialkylaminosulfonyl, bromo, chloro, amido, halo, benzodioxepinyl, polycyclic heterocyclyl, polycyclic substituted aryl, methoxycarbonyl, alkoxycarbonyl, thiophenyl, and nitrophenyl groups.

As used herein, the term "salts" refer to derivatives of the disclosed compounds wherein the parent compound is modified by making acid or base salts thereof. Examples of salts include, but are not limited to, mineral or organic acid salts of basic groups such as amines; and alkali or organic salts of acidic groups such as carboxylic acids. Salts include the conventional non-toxic salts or the quaternary ammonium salts of the parent compound formed, for example, from non-toxic inorganic or organic acids. For example, such conventional non-toxic salts include those derived from inorganic acids such as hydrochloric, hydrobromic, sulfuric, sulfamic, phosphoric, and nitric; and the salts prepared from organic acids such as acetic, propionic, succinic, glycolic, stearic, lactic, malic, tartaric, citric, ascorbic, pamoic, maleic, hydroxymaleic, phenylacetic, glutamic, benzoic, salicylic, sulfanilic, 2-acetoxybenzoic, fumaric, toluenesulfonic, methanesulfonic, ethane disulfonic, oxalic, and isethionic, and the like.

Salts can be synthesized from the parent compound which contains a basic or acidic moiety by conventional chemical methods. In some instances, such salts can be prepared by reacting the free acid or base forms of these compounds with a stoichiometric (or larger) amount of the appropriate base or acid in water or in an organic solvent, or in a mixture of the two; generally, nonaqueous media like ether, ethyl acetate, ethanol, isopropanol, or acetonitrile are preferred. Lists of suitable salts are found in Remington's Pharmaceutical Sciences, 17th ed., Mack Publishing Company, Easton, Pa., 1985, the disclosure of which is hereby incorporated by reference.

The term "solvate" means a compound, or a salt thereof, that further includes a stoichiometric or non-stoichiometric amount of solvent bound by non-covalent intermolecular forces. Where the solvent is water, the solvate is a hydrate. The term "prodrug" means a derivative of a compound that can hydrolyze, oxidize, or otherwise react under biological conditions (in vitro or in vivo) to provide an active compound, particularly a compound of the invention. Examples of prodrugs include, but are not limited to, derivatives and metabolites of a compound of the invention that include biohydrolyzable moieties such as biohydrolyzable amides, biohydrolyzable esters, biohydrolyzable carbamates, biohydrolyzable carbonates, biohydrolyzable ureides, and biohydrolyzable phosphate analogues. Specific prodrugs of compounds with carboxyl functional groups are the lower alkyl esters of the carboxylic acid. The carboxylate esters are conveniently formed by esterifying any of the carboxylic acid moieties present on the molecule. Prodrugs can typically be prepared using well-known methods, such as those described by Burger's Medicinal Chemistry and Drug Discovery 6th ed. (Donald J. Abraham ed., 2001, Wiley) and Design and Application of Prodrugs (H. Bundgaard ed., 1985, Harwood Academic Publishers GmbH).

In some cases, the compound is picrotoxinin, shown below.

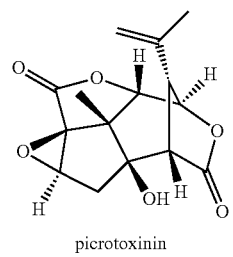

picrotoxinin

Picrotoxinin is a picrotoxane sesquiterpenoid that is 3a,4,5,6,7,7a-hexahydro-1H-indene-3,7-dicarboxylic acid which is substituted at positions 3a, 6, and 7a by methyl, isopropenyl, and hydroxy groups, respectively; in which the double bond at position 2-3 has been epoxidised; and in which the carboxy groups at positions 3 and 7 have undergone gamma-lactone formation by O-alkylation to positions 4 and 5, respectively. A component of picrotoxin, where picrotoxin is an equimolar mixture of picrotoxinin ($C_{15}H_{16}O_6$; CAS #17617-45-7) and picrotin ($C_{15}H_{18}O_7$; CAS #21416-53-5). Of the two compounds, picrotin is less active.

Picrotoxinin has a role as a plant metabolite, a gamma-aminobutyric (GABA) antagonist and a serotonergic antagonist. It is an organic heteropentacyclic compound, an epoxide, a tertiary alcohol, a gamma-lactone and a picrotoxane sesquiterpenoid.

Picrotoxin is used as a central nervous system stimulant, antidote, convulsant, and GABA (gamma aminobutyric acid) antagonist. It is a noncompetitive, antagonist at $GABA_A$ receptors and thus a convulsant. Picrotoxin has been used as a CNS stimulant and an antidote in poisoning by CNS depressants, especially barbiturates.

Picrotoxin unfortunately has a relatively high toxicity for mammals. According to the Register of Toxic Effects of Chemical Substances, the LDLo, or lowest reported lethal dose, is 0.357 mg/kg to mammals. This translates to 15 mg per person (assuming 50 kg in weight). Hence, in some cases the compounds described herein, including picrotoxin, are not applied to agricultural crops.

Parasites

The compounds and compositions described herein can kill, inhibit the growth or inhibit the reproduction of a variety of parasites, including mites. For example, the compounds and compositions described herein can kill, inhibit the growth or inhibit the reproduction of mites of the genus *Varroa*. Species of mites that can be killed or inhibited include *Varroa destructor* mites, *Varroa jacobsoni* mites, or a combination thereof.

Bees

A variety of types of bees, bee larvae, and bee eggs can be treated to reduce mite growth and reproduction. There are 11 species of honeybees, spanning every continent except Antarctica, and their ancestors have existed for over 80 million years. The Western honeybee, *Apis melliferu* are therefore present globally.

The genus *Apis*—into which all honey bees fall—is a diverse bee genus, with at least 44 known sub varieties. These are all united by traits of honey production, wax comb production, and living in a colony with a queen. Examples of bees from the genus *Apis* that can be treated pursuant to the methods and compositions described herein include *Apis mellifera, Apis mellifera mellifera, Apis mellifera liguistica, Apis mellifera carnica, Apis mellifera caucasica, Apis mellifera iberiensis, Apis mellifera scutellata, Apis cerana, Apis dorsata*, and combinations thereof.

*Apis mellifera*—literally meaning the honey-baring bee—is the most widely distributed and domesticated bee species in the world. Known for its striped yellow abdomen, large colony sizes, and propensity for enclosed communal hive-style living spaces (originally dead, hollowed trees) the European bee offers clear behavioral benefits to humans wanting to keep them. For the past 5,000 years, domestication has had a significantly impact on *Apis* genetics, selectively breeding out aggressive behaviors and prioritizing honey production and climate hardiness for their human utility. Due to these characteristics, our taste for honey, and our need for pollination services, *Apis mellifera* can now be found in many places it never previously existed, such as the USA, Australia, and all of Asia.

*Apis mellifera mellifera* is also referred to as the dark or German honey bees. *Apis m. mellifera* bees are smallish, stocky, and as the name suggests, range in color from jet black to dark brown. They are native to the UK, Scandinavia, and Germany, and are well adjusted to the cold and damp. *Apis m. mellifera* bees show no hint of yellow coloring in their purest form. However, due to the proliferation of the *Italian bee* finding a pure variety of *Apis m. mellifera* is rare.

*Apis mellifera liguistica* is also referred to as the Italian honey bees. *Apis m. liguistica* is the most common sub-variety of *Apis mellifera*. It is generally the most popular variety of domesticated bee in the world. This variety seems to have successfully held out in Italy during the last ice age, and as a result is adapted to a warmer climate than its Northern cousins. Italian bees have been cross bred all over the world with other varieties due to their gentle temperament and industrious production of honey, brood (bee eggs), and wax.

*Apis mellifera cornica* is also referred to as the Carneolan or Grey honey bees. *Apis m. carnica* originated in Eastern Europe, between Austria, Hungry, Bulgaria and Bosnia and Serbia. These bees tend to be smaller than most other bees and they appear grey due to the large amount of hairs on its body. These bees are especially known for being gentle and incredibly easy to work with, making them perfect for backyard beekeepers concerned with aggressive behavior. They are also known to over-winter with a greatly downsized population, so they do not require great stores of honey over-winter. However, in spring, *Apis m. carnica* will jump rapidly to life, quickly building up the size of the colony.

*Apis mellifera caucasica* is also referred to as the Caucasian honey bees. *Apis mellifera caucasica* are native to the Caucasus region, whose mountain range divides South-Eastern Europe from Asia. Like the *Apis mellifera carnica*, the *Apis mellifera caucasica* bees are hairy, can appear grey, and share the mild temperament of the *Apis mellifera carnica* bees. However, *Apis mellifera caucasica* can be slow in building up their colony, and fare poorly in the cooler, damper climates of Northern Europe.

*Apis mellifera iberiensis* is also referred to as the Iberian or Gibraltar honey bees. These are a small black bee found mostly throughout the Iberian Peninsula (Spain and Portugal) but despite sharing the area with the Italian bee, their genetics remain incredibly pure. However, there is still some genetic diversity within their own variety.

Although now synonymous with the "African killer bee" title, *Apis mellifera scutellata* is in fact not a great deal genetically different from its European cousins. Originating in Southern Africa, this variety rose to ill-fortuned fame when a group of scientists in southeastern Brazil allowed hybrid stock to escape. The scientists, who had been breeding *Apis m. scutellata* with other European varieties, bred an abnormally aggressive variety, exhibiting unusual behaviors such as an expanded 30-meter patrol radius surrounding their colony. This variety have expanded rapidly through the Americas due to other dominant tendencies, including forcibly taking over other colonies by executing and replacing their natural queen. *Apis m. scutellata* will send between 3 to 4 times the number of bees to defend against intruders as other varieties of honey bees.

*Apis cerana* are also referred to as Asiatic or Eastern or Himalayan honey bees. *Apis cerana* are found in the vast range from Northern India, across South East Asia, Malaysia, Indonesia, the Philippines and Japan. The smaller size, and less populous colonies of this variety mean they do not produce as much honey as their European counterparts. Because of this, many *Apis mellifera* varieties have been imported by beekeepers in the region, which may have been good for the honey business, but perhaps not so good for bees. This is because many of the diseases previously isolated to this region, most notably *Varroa* mites, have spread to *Apis mellifera*.

Because *Apis cerana* has coexisted with these diseases for several thousands of years, *Apis cerana* have adaptive behaviors for dealing with them. *Apis cerana* are an incredibly hygienic bee, clearing and renewing the wax of brood combs, and protecting vulnerable bee larvae from parasites such as *Varroa*. Other unique adaptations include a hardiness to temperature changes. *Apis cerana* can reportedly survive freezing temperatures far better than European bees and have also developed a means of defending against their particularly large predators such as the Asian hornet. They do this by surrounding the large predator and vibrating their wing muscles so intensely that the heat generated will cook the covered hornet to death.

*Apis dorsata* are also referred to as the giant honey bee. *Apis dorsata* are found in South and South East Asia. They are considerably larger than most other honey bee species. Unlike *Apis mellifera, Apis dorsata* colonies do not nest in enclosed cavities, but under hanging trees and rocky cliffs, meaning they cannot be domesticated in hives, like other varieties. Instead, the honey of this group is harvested by climbing to the great heights where they build their colonies and cutting off the combs directly.

Compositions

Compositions described herein can include at least one of the compounds described herein. The compositions can also include additional components such as a carrier, solvent, surfactant, an additional active ingredient, or a combination thereof.

These compositions are useful for killing mites or for reducing the viability of mites such as *Varroa* mites (e.g., *Varroa destructor* mites, *Varroa jacobsoni* mites, or a combination thereof).

The composition can contain varying amounts of the compounds. For example, the compounds can be present in liquid compositions at concentrations of about 0.1 µg/mL to about 1000 µg/mL, or about 1 µg/mL to about 800 µg/mL, or about 3 µg/mL, to about 600 µg/mL, or about 5 µg/mL to about 500 µg/mL, or about 5 µg/mL to about 300 µg/mL.

In dry compositions, the compounds can be present in at weight/weight concentrations of about 0.1 µg/g to about 1000 µg/g, or about 1 µg/g to about 800 µg/g, or about 3 µg/g to about 600 µg/g, or about 5 µg/g to about 500 µg/g, or about 5 µg/g to about 300 µg/g.

In some cases, about 0.01 to 100 mg may be sufficient for treating one area, mite colony, or be hive. In some cases, about 0.1 to 10 mg, or about 0.2 to 9 mg, or about 0.3 to about 8 mg, or about 0.5 mg to about 5 mg, or about 0.8 mg to about 3 mg, or about 0.9 mg to about 1.1 mg, or about 1 mg might can be used to treat a colony for *Varroa* mite control.

The compositions can be dry or liquid compositions.

In some instances, the compounds are dissolved in a carrier such as a solvent to form a liquid composition with a known concentration of at least one component or compound from an extract described herein. The solvent can be an alcohol, ethyl acetate, acetone, water, or a combination thereof. For example, the solvent can be ethanol, methanol, ethyl acetate, acetone, water, or a combination thereof.

The compositions can contain a carrier such as an emulsifier, a dispersing agent, thickening agent, a surfactant, a clay, a polymer, a colorant, a wetting agent of ionic or non-ionic type, a natural or regenerated mineral substance, a dispersant, a wetting agent, a tackifier, a thickener, a binder, or a mixture of such carriers. For example, the compositions can contain polyacrylic acid salts, lignosulphonic acid salts, phenolsulphonic or naphthalenesulphonic acid salts, polycondensates of ethylene oxide with fatty alcohols or with fatty acids or with fatty amines, substituted phenols (in particular alkylphenols or arylphenols), salts of sulphosuccinic acid esters, taurine derivatives (in particular alkyl taurates), phosphoric esters of polyoxyethylated alcohols or phenols, fatty acid esters of polyols, and derivatives of the present compounds containing sulfate, sulfonate and phosphate functions. The presence of at least one surfactant can be included when the active compound and/or the inert support are water-insoluble and when the vector agent for the application is water. For example, surfactant content can be about 5% to 40% by weight of the composition.

In some cases, the compounds can be formulated in delayed release or sustained release compositions. For example, the compound(s) may also be formulated for sustained release (using, for example, microencapsulation, see WO 94/07529, and U.S. Pat. No. 4,962,091). In some cases, the compounds can be formulated to be released in 10-20 days.

Optionally, additional components may also be included in the compositions, for example, protective colloids, adhesives, thickeners, thixotropic agents, penetration agents, stabilizers, sequestering agents. The compositions can also include other ingredients. For example, bactericidal compounds can be employed. In addition, the compounds described herein can be used together in a composition or they can be used concomitantly with one or more of the other agrichemicals such as various pesticides, acaricides, nematicides, other types of fungicides, and plant growth regulators.

The compounds described herein can be used in a weight ratio relative to an anti-bacterial or fungicide such as from 1:0.001 to 1:1000 as a weight ratio. In some instance, the amount of compound relative to an antibacterial or fungicide can vary from 1:0.01 to 1:100 as a weight ratio within a composition.

More generally, the active compounds can be combined with any solid or liquid additive, which complies with the usual formulation techniques. In general, the composition according to the invention may contain from 0.05 to 99% by weight of active compounds, or from 10 to 90% by weight.

The compounds or compositions can be provided in a form that is ready-to-use or in a form that can be prepared for use. The compounds or compositions can be applied, by a suitable device, such by use of a spraying or dusting device. The compounds or compositions can be applied by use of brush or roller.

The compounds or compositions can be provided in concentrated commercial compositions that should be diluted before application to the beehives, surfaces that bees frequent, flowering plants, agricultural crops, or combinations thereof. For example, the compounds or compositions can be provided in dry (e.g., lyophilized) form, or in concentrated form, and then dissolved, or diluted as desired. The compositions can be in formulated into an aerosol dispenser, as a cold fogging concentrate, as a dustable powder, as an emulsifiable concentrate, as an emulsion oil in water, as an emulsion water in oil, as an encapsulated granule, as a fine granule, as a flowable concentrate for hive treatment, as a gas (under pressure), as a gas generating product, as granules, as a hot fogging concentrate, as macrogranules, as microgranules, as an oil dispersible powder, as an oil miscible flowable concentrate, as an oil miscible liquid, as a paste, as a plant rodlet, as a powder for hive treatment, sugars combined with the composition, as a soluble concentrate, as a soluble powder, as a solution for seed (or other) treatment, as a suspension concentrate (flowable concentrate), as an ultra-low volume (ULV) liquid, as an ultra-low volume (ULV) suspension, as water dispersible granules or tablets, as a water dispersible powder for slurry treatment, as water soluble granules or tablets, as a water soluble powder for hive treatment, as a wettable powder, or as a combination thereof (e.g., two types of formulations packaged together).

Methods

The compounds and/or compositions can be used in methods for killing mites or inhibiting mite infestation of bees, bee larvae, bee eggs, and habitats frequented or occupied by bees. The methods can, for example, inhibit infestation of bee hives and surfaces frequented by bees. The methods can include contacting bees, bee hives, plants, or surfaces frequented by bees with one or more of the compounds or compositions described herein.

For example, hive surfaces can be coated, dusted, or sprayed with one or more of the compounds or compositions described herein. Such treatment of hive surfaces can be done before bees occupy a hive. For example, materials used to construct be hives can be pre-treated with one or more of the compounds or compositions described herein and then the hives can be constructed from the pre-treated materials.

In other cases, hives occupied by bees can be opened and sprayed or dusted with one or more of the compounds or compositions described herein. Hives with mites or suspected of having mites can be so treated.

In some cases, flowering plants or crops frequented by bees can be dusted or sprayed with one or more of the compounds or compositions described herein. However, in other cases agricultural crops are not treated with one or more of the compounds or compositions described herein.

The compounds, compositions, and methods described herein can reduce existing mite populations by at least 2%, or 5%, or 10%, or 15%, or 20%, or 25%, or 30%, or 35%, or 40%, or 45%, or 50%, or 55%, or 60%, or 65%, or %70, or 80%, or 90%, 95%, or 97%, or 99%, or 100%, or by any numerical percentage between 5% and 100% compared to a control. In some cases, the compounds and compositions described herein reduce mite populations by at least 2-fold, or 3-fold, or 4-fold, or 5-fold, or 7-fold, or 10-fold compared to a control. The control can be a no treatment control (e.g., placebo).

The compounds, compositions and methods described herein can inhibit mite occupation or mite infestation at a site that is treated for 1 day, 2 days, 3 days, 1 week, 2 weeks, 4 weeks, 1 month, 2 months, 3 months, 4 months, 5 months, or 6 months.

The compounds and compositions described herein can be applied only once to bees, bee hives, plants, or surfaces frequented by bees. In some cases, the compounds and compositions described herein can be applied to bees, bee hives, plants, or surfaces frequented by bees two times, three times, four times, five times or as needed to inhibit mite infestation.

The following Examples illustrate some of the experimental work involved in the development of the invention.

Example 1: Materials and Methods

This Example describes some of the materials and methods used in the development of the invention.

Honey Bees

Honey bees were obtained from the MSU apiary. Forty to fifty colonies were routinely kept during summer months for experiments. Foragers were used for $LD_{50}$ determination because they are the most sensitive to toxins.

Varroa Mites

Varroa mites (Varroa destructor) were collected from colonies at the Michigan State University apiary in East Lansing, MI. Mites were collected using the "sugar shake" method (Macedo and Ellis 2002). Approximately 350 bees were brushed from brood frames into a plastic basin and then poured into 473 ml wide-mouth Mason jars fitted with screen lids (3 mm×3 mm mesh). Approximately 8 g powdered sugar were sifted through the screen and the jar was shaken for 20 seconds and let to sit for 3 minutes. The mites then fell through the screen onto a piece of paper. Mites were collected, and the sugar dusts were washed off using moistened paintbrushes. Mites were kept in Petri-dishes with worker pupae and transported to the campus lab for $LD_{50}$ determination.

Chemicals

All chemicals were purchased from Santa Cruz Biotechnology (see website at scbt.com).

$LD_{50}$ Determination for Mites

Chemicals were dissolved in acetone serially diluted to obtain appropriate dosages. Each mite was topically applied with 0.2 µl of acetone containing the tested chemicals. A triplicate of 10 mites per dose were then housed in a Petri dish (diameter 3 cm, 34.5° C., RH 75%) with one white-eyed worker pupa as food. Mortality was assessed at 24 h. Mites were considered dead if no movement is observed in response to prodding with a metal probe.

$LD_{50}$ Determination for Bees

Foragers were collected when they were returning to the hive by an insect vacuum. Foragers were briefly anesthetized with carbon dioxide and individual forager was dosed with 4 µl of acetone containing various dosages of insecticide (at least 5 doses per drug) and a control with 4 µl of acetone only. Bees then were caged together (a triplicate of 10 bees per dose per colony) and their mortality observed for 2 days (acute toxicity) in an incubator (34.5° C., RH 75%).

Data Analyses

For both bee and mite mortality data, control mortality was used to correct the mortality of different doses of drugs (Abbott, 1925). A Log-Probit line was fitted for each treatment from which the $LD_{50}$ values and 95% confidence intervals were calculated using the R statistical package (R Development Core Team 2008).

Example 2: Picrotoxinin Kills Varroa Mites Without Killing Honey Bees

The toxicity of picrotoxinin to Varroa mites was determined as described in Example 1.

An average of 20.16±2.00 (mean±se) ng per mite was determined for the picrotoxinin $LD_{50}$. However, for bees, even 2,000,000 ng (2 mg) failed to kill any honeybees. Higher doses to honey bees were not tested because 2 mg was the highest amount one can dissolve with 4 µl acetone.

Therefore, Varroa mites are at least 100,000-fold more susceptible to picrotoxinin toxicity compared to honey bees. The much lower susceptibility of honeybees to picrotoxinin indicates that the use of picrotoxinin at levels sufficient to kill Varroa mites does not harm honeybees.

Example 3: Toxicity of Various Other Chemicals to Varroa Mites

This Example illustrates the dosages of several compounds for killing Varroa mites.

The mean $LD_{50}$ values of various compounds for killing mites was determined using the methods described in Example 1.

Table 1 shows $LD_{50}$ values of candidate miticides to Varroa mites and honey bees. Cyfluthrin was tested as a positive control to show that Varroa mites can be killed in the methods described in Example 1.

TABLE 1

$LD_{50}$ of candidate miticides to Varroa mites and honey bees.

| | $LD_{50}$ 1 (ng/mite) | $LD_{50}$ 2 (ng/mite) | $LD_{50}$ 3 (ng/mite) | Mean $LD_{50}$ (ng/mite) | $LD_{50}$ (ug/bee) |
|---|---|---|---|---|---|
| Picrotoxinin | 20.82 | 22.61 | 17.05 | 20.16 ± 2.00 | >2000 (max dose 2000 ug/bee) |
| Cyfluthrin | 0.46 | 0.82 | 0.60 | 0.63 ± 0.18 | ND |
| Ginkolide A | 348.63 | 1049.82 | 208.10 | 535.52 ± 450.90 | ND |

ND: not determined

As illustrated in Table 1, the mean $LD_{50}$ of Ginkolide A to Varroa mite was determined to be 535.52±450.90 ng/mite. This is rather low in toxicity for reducing Varroa mite populations, likely preventing it from being considered to be a miticide.

Other chemicals including Bilobalide, Ginkolide B and Ginkolide C were tested using methods described in Example 1. The results are summarized in Table 2.

TABLE 2

$LD_{50}$ of candidate miticides to *Varroa* mites.

| | max. Dose trial 1 (ng/mite) | max. Dose trial 2 (ng/mite) | max. Dose trial 3 (ng/mite) | estimated $LD_{50}$ (ng/mite) |
|---|---|---|---|---|
| Bilobalide | 3200.00 | 3200.00 | 32.00.00 | >3200 |
| Ginkolide B | 3200.00 | 3200.00 | 3200.00 | >3200 |
| Ginkolide C | 3200.00 | 3200.00 | 3200.00 | >3200 |

Table 2 shows that other chemicals such as Bilobalide, Ginkolide B and Ginkolide C, had even lower mite toxicities. As illustrated, none of the chemicals showed significant mite mortality even at the highest dose, thus their $LD_{50}$ cannot be calculated. Even the highest doses failed to kill 50% of the mite population.

Example 4: Picrotoxinin *Varroa* Mite/Bee Picrotoxin Susceptibility

This Example illustrates that *Varroa* mites can obtain the picrotoxinin from bees, and that bees can tolerate a lot more picrotoxinin than *Varroa* mites.

Methods:

Picrotoxinin was dissolved in acetone (0.0064 gram picrotoxinin in 1.6 ml acetone=4 ug/ul) and then serially diluted to various doses. A selected amount of picrotoxinin was applied to each bee after $CO_2$ anesthetization. Then, the bees were inoculated with *Varroa* mites (10 mites on 10 bees per dish). This procedure was employed to ensure that the mites were obtaining the chemical from the bees.

Results:

The numbers of dead *Varroa* mites and dead bees were recorded after 2, 4 and 24 hours. These data are shown in Tables 3 and 4 below.

TABLE 3

Effects of Picrotoxinin on Mites and Bees

| dose | dish # | 2-hour dead mite | 2-hour dead bee | 4-hour dead mite | 4-hour dead bee | 24-hour dead mite | 24-hour dead bee |
|---|---|---|---|---|---|---|---|
| no solvent | 1 | | | | | | |
| no solvent | 2 | | | 1 | | 1 | |
| solvent (0.5 ul) | 3 | | | | | | |
| solvent (0.5 ul) | 4 | 1 | | 1 | | 1 | |
| 0.000005 ug/bee | 5 | | | | | 1 | |
| 0.000005 ug/bee | 6 | | | | | 1 | |
| 0.00005 ug/bee | 7 | | | 1 | | | |
| 0.00005 ug/bee | 8 | | | | | | |
| 0.0005 ug/bee | 9 | 1 | | 3 | | 3 | |
| 0.0005 ug/bee | 10 | | | | | 2 | |
| 0.005 ug/bee | 11 | | | 1 | | 1 | |
| 0.005 ug/bee | 12 | 1 | | 1 | | 4 | 1 |
| 0.05 ug/bee | 13 | | | 2 | | 5 | |
| 0.05 ug/bee | 14 | | | 1 | | 3 | |
| 0.1 ug/bee | 13 | | 1 | 5 | 1 | 6 | 1 |
| 0.1 ug/bee | 14 | 2 | | 4 | | 9 | 0 |
| 1 ug/bee | 15 | 2 | | 4 | 1# | 7 | 1# |
| 1 ug/bee | 16 | 4 | | 5 | | 10 | 3# |

The symbol # indicates that bees were dead perhaps due to leaked sugar syrup, because dead bees were soaked with syrup.

TABLE 4

Effects on Mites and Bees When Using Higher Doses of Picrotoxinin

| Treatment | 24 hr dead mite | 24 hr dead bee |
|---|---|---|
| Solvent control | 0 | 0 |
| 1 ug/ul | 9 | 0 |
| 1 ug/ul | 10 | 0 |
| 4 ug/ul | 10 | 1 |
| 4 ug/ul | 10 | 0 |

REFERENCES

Abbott W S (1925). A method of computing the effectiveness of an insecticide J. Econ. Ent. 18: 265-167.

Ahn Y, Kwon, M, Park H M and Han C K (1997). Potent insecticidal activity of Ginkgo biloba derived trilactone terpenes against Nilaparvata lugens. In: Hedin, P. A., Hollingsworth, R. M., Masler, E. P., Miyamoto, J., Thompson, D. G. (Eds.), Phytochemicals for Pest Control, ACS Symposium Series No. 658. American Chemical Society, Washington, DC, pp. 90-105.

Chauzat M P, Martel A C, Zeggane S, Drajnudel P, Scharr F, et al. (2010). A case control study and a survey on mortalities of honey bee colonies (*Apis mellifera*) in France during the winter of 2005-6. J Apic Res 49: 40-51.

Chen Y P, Pettis J S, Evans J D, Kramer M, Feldlaufer M F (2004). Transmission of Kashmir bee virus by the ectoparasitic mite *Varroa destructor*. Apidologie 35: 441-448.

Dainat B, Evans J D, Chen Y P, Gauthier L, Neumann P (2012). Predictive Markers of Honey Bee Colony Collapse, PLoS ONE 7(2): e32151.

Di Prisco G, Pennacchio F, Capri E, Boncristiani H F, Evans J D, et al. (2011) *Varroa destructor* is an effective vector of Israeli acute paralysis virus in the honeybee, *Apis mellifera*. J Gen Virol 92: 151-155.

Ehrenberger K, Benkoe E, Felix D (1982). Suppressive action of picrotoxin, a GABA antagonist, on labyrinthine spontaneous nystagmus and vertigo in man. Acta Oto-Laryngologica 93: 269-273.

Guzman-Novoa E, Eccles L, Calvete Y, Mcgowan J, Kelly P G, et al. (2010). *Varroa destructor* is the main culprit for the death and reduced populations of overwintered honey bee (*Apis mellifera*) colonies in Ontario, Canada. Apidologie 41: 443-450.

Highfield A C, El Nagar A, Mackinder L C M, Noel L M L J, Hall M J, et al. (2009). Deformed wing virus implicated in overwintering honeybee colony losses. Appl Environ Microbiol. 75: 7212-7220.

Honda H. (1997). Ginkgo and insects. In T Hori, R W Ridge, W Tulecke, P Del Tredici, J Tremouilaux-Guiller, H Tobe (Eds.), Ginkgo biloba a global treasure: from biology to medicine, Springer-Verlag, Tokyo (1997), pp, 243-250.

Klein A-M, Vaissière B E, Cane J H, Steffan-Dewenter I, Cunningham S A, Kremen C and Tscharntke T (2007). Importance of pollinators in changing landscapes for world crops. Proceedings of the Royal Society of London. Series B: Biological Sciences, 274: 303-313.

Kuster R D, Boncristiani H F and Rueppell O. (2014). Immunogen and viral transcript dynamics during parasitic *Varroa destructor* mite infection of developing honey bee (*Apis mellifera*) pupae. The J. of Exp. Biol. 217: 1710-1718.

Lonsdorf E, Ricketts T, Kremen C, Winfree R, Greenleaf S, Williams N. (2011) Crop pollination services. In: Karvera P, Tallis H, Ricketts T H, Daily G C, Polasky S (eds) Natural capital. Theory and practice of mapping ecosystem services. Oxford University Press, Oxford, pp 168-187.

Losey J E and Vaughan M. (2006), The economic value of ecological services provided by insects. BioScience, 56: 311.

Macedo P A and Ellis M D (2002). Using inert dusts to detect and assess *Varroa* mite infestations in honey bee colonies. J. Apicult. Res. 40: 3-7.

Morse R A and Calderone N W. (2000). The value of honey bees as pollinators of U.S. crops in 2000. Bee Culture: 2-15.

Nazzi F, Brown S P, Annoscia D, Del Piccolo F, Di Prisco G, Varricchio P, Della Vedova G, Cattonaro F, Caprio E and Pennacchio F (2012). Synergistic parasite—pathogen interactions mediated by host immunity can drive the collapse of honeybee colonies. PLoS Pathog. 8, e1002735.

Ollerton J, Price V, Armbruster W S, Memmott J, Watts S, Waser N M, Totland Ø, Goulson D, Alarcón R, Stout J C and Tarrant S (2012). Overplaying the role of honey bees as pollinators: a comment on Aebi and Neumann (2011). Trends in Ecology and Evolution, 27: 141-142.

R Development Core Team (2008). R: A language and environment for statistical computing. R Foundation for Statistical Computing, Vienna, Austria. ISBN 3-900051-07-0, website www.R-project.org.

Vaknin Y (2011). The significance of pollination services for biodiesel feedstocks, with special reference to Jatropha curcas L.: a review. BioEnergy Research, 5: 32-40.

Winfree R, Gross B J and Kremen C (2011). Valuing pollination services to agriculture. Ecological Economics, 71: 80-88.

All patents and publications referenced or mentioned herein are indicative of the levels of skill of those skilled in the art to which the invention pertains, and each such referenced patent or publication is hereby specifically incorporated by reference to the same extent as if it had been incorporated by reference in its entirety individually or set forth herein in its entirety. Applicants reserve the right to physically incorporate into this specification any and all materials and information from any such cited patents or publications.

The following statements describe some of the elements or features of the invention, Because this application is a provisional application, these statements may become changed upon preparation and filing of a nonprovisional application. Such changes are not intended to affect the scope of equivalents according to the claims issuing from the nonprovisional application, if such changes occur. According to 35 U.S.C. § 111(b), claims are not required for a provisional application. Consequently, the statements of the invention cannot be interpreted to be claims pursuant to 35 U.S.C. § 112.

Statements

1. A method comprising contacting one or more bees, bee larvae, bee eggs, bee hives, or surfaces frequented by bees with a composition comprising a carrier and one or more of the compounds of formula I:

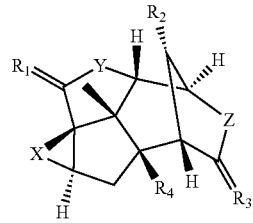

wherein:
   X, Y, and Z are independently oxygen, amino, or sulfur;
   $R_1$ and $R_3$ are each independently an oxygen atom, amino, sulfur, sulfide, or sulfoxide;
   $R_2$ is lower alkyl or lower alkylene; and
   $R_4$ is hydroxy, sulfide, sulfoxide or sulfate.

2. The method of statement 1, wherein one of the compounds is picrotoxinin.

3. The method of statement 1 or 2, which kills mites with an average LD50 of about 1 ng per mite to about 50 ng per mite.

4. The method of statement 1, 2 or 3, which kills rites with an average LU50 of about 20 ng per mite.

5. The method of statement 1-3 or 4, which reduces an existing mite population by at least 2%, or 5%, or 10%, or 15%, or 20%, or 25%, or 30%, or 35%, or 40%, or 45%, or 50%, or 55%, or 60%, or 65%, or %70, or 80%, or 90%, 95%, or 97%, or 99%, or 100% compared to a control.

6. The method of statement 1-4 or 5, which reduces an existing mite population by at least 2-fold, or 3-fold, or 4-fold, or 5-fold, or 7-fold, 10-fold, 50-fold, 100-fold, 500-fold, 1000-fold compared to a control.

7. The method of statement 1-5 or 6, wherein *Varroa* mites are at least 100,000-fold more susceptible to the composition than are honeybees 8. The method of statement 5 or 6, wherein the control is a solvent or carrier for the one or more compounds.

9. The method of statement 1-7 or 8, wherein the composition is a delayed release or sustained release composition.

10. The method of statement 1-8 or 9, where the one or more bees, bee larvae, bee eggs, beehives, or surfaces frequented by bees have mites or are suspected of having mites.

11. The method of statement 3-9 or 10, wherein the mites are *Varroa* mites.

12. The method of statement 1-10 or 11, where the surfaces frequented by bees are beehives, materials for construction of beehives, flowering plants, or agricultural crops.

The specific compositions and methods described herein are representative, exemplary and not intended as limitations on the scope of the invention. Other objects, aspects, and embodiments will occur to those skilled in the art upon consideration of this specification and are encompassed within the spirit of the invention as defined by the scope of the claims. It will be readily apparent to one skilled in the art that varying substitutions and modifications may be made to the invention disclosed herein without departing from the scope and spirit of the invention. The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by embodiments and optional features, modification and variation of the concepts herein disclosed may be resorted to by those skilled in the art, and that such modifications and variations are considered to be within the scope of this invention as defined by the appended claims and statements of the invention.

The invention illustratively described herein may be practiced in the absence of any element or elements, or limitation or limitations, which is not specifically disclosed herein as essential. The methods and processes illustratively described herein may be practiced in differing orders of steps, and the methods and processes are not necessarily restricted to the orders of steps indicated herein or in the claims.

As used herein and in the appended claims, the singular forms "a," "an," and "the" include plural reference unless the context clearly dictates otherwise. Thus, for example, a reference to "a compound" or "an antibody" or "a cell" includes a plurality of such compounds, antibodies, or cells, and so forth. In this document, the term "or" is used to refer to a nonexclusive or, such that "A or B" includes "A but not B," "B but not A," and "A and B," unless otherwise indicated.

The term "about" can allow for a degree of variability in a value or range, for example, within 10%, within 5%, or within 1% of a stated value or of a stated limit of a range. When a range or a list of sequential values is given, unless otherwise specified any value within the range or any value between the given sequential values is also disclosed.

Under no circumstances may the patent be interpreted to be limited to the specific examples or embodiments or methods specifically disclosed herein. Under no circumstances may the patent be interpreted to be limited by any statement made by any Examiner or any other official or employee of the Patent and Trademark Office unless such statement is specifically and without qualification or reservation expressly adopted in a responsive writing by Applicants.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein. In addition, where features or aspects of the invention are described in terms of Markush groups, those skilled in the art will recognize that the invention is also thereby described in terms of any individual member or subgroup of members of the Markush group.

What is claimed:

1. A method comprising:

contacting one or more bees, bee larvae, bee eggs, beehives, flowering plants, or agricultural crops comprising *Varroa* mites with a composition comprising a carrier and picrotoxinin;

wherein the contacting with the composition inhibits growth and/or spreading of the *Varroa* mites.

2. The method of claim 1, wherein the method inhibits reproduction of the *Varroa* mites.

3. The method of claim 1, wherein the method kills the *Varroa* mites with an average LD50 of about 20 ng per mite.

4. The method of claim 1, wherein the method reduces the *Varroa* mite population by at least 10% compared to a *Varroa* mite population that is not contacted with the composition.

5. The method of claim 1, wherein the composition is a delayed release or sustained release composition.

6. The method of claim 1, wherein the contacting comprises applying the composition to a bee colony.

7. A method comprising:

contacting one or more bee larvae, bee eggs, beehives, or a bee colony comprising *Varroa* mites with a composition comprising a carrier and picrotoxinin.

* * * * *